United States Patent [19]

Kawamura et al.

[11] 4,153,341

[45] May 8, 1979

[54] AUTOMATIC FOCUSING APPARATUS

[75] Inventors: Yoshio Kawamura; Shigeo Moriyama, both of Kokubnji, Japan

[73] Assignee: Hitachi, Ltd., Japan

[21] Appl. No.: 783,141

[22] Filed: Mar. 31, 1977

[30] Foreign Application Priority Data

Apr. 2, 1976 [JP] Japan .................................. 51-36002

[51] Int. Cl.² ............................................... G02B 7/11
[52] U.S. Cl. .................................................... 350/255
[58] Field of Search ...................... 350/255; 355/55, 56

[56] References Cited

U.S. PATENT DOCUMENTS

| | | | |
|---|---|---|---|
| 3,511,149 | 5/1970 | Blattner et al. | 350/255 UX |
| 3,519,334 | 7/1970 | Heitmann et al. | 350/255 |
| 3,704,657 | 12/1972 | Sliwkowski et al. | 350/255 UX |
| 3,984,678 | 10/1976 | Uchiyama et al. | 350/255 X |

Primary Examiner—F. L. Evans
Attorney, Agent, or Firm—Craig & Antonelli

[57] ABSTRACT

This invention relates to an automatic focusing apparatus, in that a position of a substrate mounted on the base of the apparatus is detected as a pressure value by a first detecting means, such as an air micrometer, in that second detecting means, such as an air micrometer, are provided on a portion of the apparatus to determine a reference pressure, gas supplied into the second detecting means is derived from the same supply source as that of the first detecting means, and further, in that the base can be controlled and moved until the difference between the reference pressure and the detected pressure reaches a predetermined constant value, whereby the surface of the sample can be automatically positioned at a desired focusing position.

25 Claims, 4 Drawing Figures

AUTOMATIC FOCUSING APPARATUS

BACKGROUND OF THE INVENTION

This invention relates to an automatic focusing apparatus for use in an optical system including a lens, more particularly, an optical system for observing an object, such as a microscope, or an industrial camera, such as a projection camera, e.g. a reduction camera, or the like.

When a substrate coated with sensitive material is positioned at the focus of a reduction camera with high resolution or the like, an apparatus for positioning the surface of the substrate at the desired focusing position, by moving it in response to a surface condition, e.g. concave and convex surface or undulated surface of the substrate, is required.

A prior construction of a focusing apparatus has been contemplated as illustrated in FIG. 1. The apparatus comprises detecting means, which utilizes an image field of a camera, for measuring the distance between the surface of the substrate and the detecting means by injecting a gas thereinto, a base for mounting the substrate (or sample), which is movable in a direction parallel to the optical axis of the camera, and a driving source and control system for moving the base in response to an output of the detecting means.

The principle of the above-mentioned detecting means for measuring the distance between the surface of the substrate and the detecting means is almost similar to that of an air micrometer. In FIG. 1, a lens housing 101 of the camera is divided by a lens 102 for reduction, and is provided with a detector 104 which surrounds a light guiding space of lens 102 at the side of the substrate 106. The detector 104 is provided with a blast hole 103, through which the gas, e.g. air having a constantly controlled pressure, is jetted, as shown with an arrow in FIG. 1, and an outlet 115 at the lower end of the detector 104. The outlet 115 has almost the same shape as that of the image field of the lens 102.

According to such a construction, the distance between the detector 104 and the substrate 106 is in a constant relation with the pressure within the detector 104 as shown in FIG. 2. Thus, the distance therebetween can be detected by measuring the pressure within the detector 104. In this case, the pressure within the detector 104 can be measured by a pressure gauge, e.g. a manometer 111, by passing a part of the gas out of the detecting means 104 through a measuring hole 105.

The focusing adjustment according to the above-mentioned focusing apparatus is hereinunder explained. First, a photoelectric cell 112 for detecting the position of a liquid surface of the manometer 111 is provided at the position of the liquid surface of the manometer which position represents the pressure value corresponding to the focal distance of the lens 102. In response to an output signal derived from the photoelectric cell 112, an electromagnetic valve 114 for supplying gas and an electromagnetic valve 113 for exhausting gas can be opened or shut, wherein the electromagnetic valve 114 for supplying the gas is connected to a suitable supply source (which is not shown in the drawing).

The substrate 106 is fixedly mounted on the base 107 which has been supported by a flexible parallel guide 108 such that it can be moved in the direction parallel to the optical axis of the lens 102. The base 107 is provided with a bellows 109 being a driving means, which is connected to the electromagnetic valves 113 and 114 through a supply and exhaust orifice 110.

The pressure within the detector 104 is lowered as the distance between the substrate 106 and the lens 102, or the detector 104, becomes greater than the predetermined distance value, so that the liquid surface of the manometer 111 is shifted. The shift of the liquid surface can be detected by the photoelectric cell 112, and then, the electromagnetic valve 114 can be opened responsive to the output of the photoelectric cell 112. Thus, the pressure within the bellows 109 is increased, so that the base 107 is moved nearer to the lens 102.

As the base 107 is moved, and the gap distance between the substrate 106 and the detector 104 reaches the predetermined distance value, then the pressure within the detector 104 indicates the predetermined pressure value and the electromagnetic valve 114 is shut. On the other hand, as the gap distance between the substrate 106 and the lens 102 is decreased, the pressure within the detector 104 is increased. Thus, the electromagnetic valve 113 for exhaust is opened and the base 107 recedes from the lens 102.

As stated above, by detecting the distance between the substrate and the lens in utilizing the image field of the substrate, by always maintaining the surface of the substrate at the predetermined position for focusing, the focusing adjustment can be done.

The gas, which is injected from the supply source into the detector 104 through the blast hole 103, has been considered to be air or the like, having a constant pressure obtained through a conventionally used pressure regulator. Instead of the above-mentioned manometer, the pressure measurement has also been considered to be accomplished by detecting the pressure difference between the pressure and the atmospheric pressure with a differential pressure transducer, which converts the predetermined focusing position into the electrical signal to open or shut the electromagnetic valves responsive to an amplified signal. The differential pressure transducer has been considered as a piezoelectric converter, which detects the pressure difference between two fluids as a displacement amount of the bellows, and which further converts its displacement into an electrical amount by means of a strain gauge or the like. Moreover, when it is unnecessary to consider the fluctuation of the atmospheric pressure of the circumference, it has been considered appropriate to use a piezoelectric converter capable of measuring the absolute pressure.

Further, the driving system of the above-mentioned focusing apparatus has been considered not only to move the base but also to move the lens housing 101. In this case, a servomotor or the like, instead of the bellows 109, has been used as the driving means, or it has been considered to regulate the distance between the lens and the substrate in a mechanism which has been supported by a piezoelectric cell.

In the focusing apparatus as detailed above, the gas is jetted into the optical path of the camera or the like, since the light guiding space of the lens 102 is utilized as a detector. In a method of supplying the gas into the detector, it has been considered to be effective to supply the gas in a tangential flow and to use it in a turning flow, so that the density distribution of the gas within the detector may be uniform. A supporting mechanism, such as a slide bearing, a roll bearing or the like, has been considered for the parallel movement mechanism in the direction of the optical axis, instead of the flexible parallel guide.

Furthermore, another focusing apparatus, which directly moves the driving system by utilizing the detected pressure, has been considered. Such an apparatus comprises a structure which leads the detected pressure from the measuring hole of the detector into the bellows, and thereby, moves the base mounting the substrate. In this case, when the gap distance between the lens and the substrate is narrowed, the detected pressure within the detector is increased. Thus, since the pressure within the bellows is increased thereby, the base is moved in a downward direction. On the other hand, as the gap distance is increased, the detected pressure is decreased. Thus, the base is moved in an upward direction since the bellows shrinks. As stated above, the focusing adjustment can be done since the surface of the substrate can be always supported at an identified position, and thus, the initially established position can be determined as the focusing position.

The driving mechanism of this apparatus is the same as that of the already-mentioned apparatus. Also, it has been considered not only to move the base but also to move the lens housing.

As detailed above, focusing apparatuses with different driving mechanisms, which utilize detectors such as air micrometers, have been considered. According to such apparatus, it is possible to precisely support the focusing position after the focusing position has been established.

However, in the case of the former focusing apparatus already mentioned, its focusing adjustment must be done by always watching the pressure of the gas supply source so that the balanced position of the base may not be influenced by the pressure fluctuation of the gas supply source. Further, in the case of the latter mentioned focusing apparatus, which directly moves the driving mechanism by utilizing the detected pressure, it is necessary to carefully increase or decrease the load of the base, and to carefully move the base up and down, in order to correctly establish the balanced position at the focusing position.

Accordingly, these prior focusing apparatuses have a common disadvantage in that the adjustment for initially determining the focusing position before operation requires a long time and a lot of effort to position the substrate surface at the focusing position.

SUMMARY OF THE INVENTION

It is an object of the present invention to provide an automatic focusing apparatus in which the adjustment to initially determine a focusing position can be easily done, before the operation for positioning the substrate surface at the focusing position, and further, in which the above-mentioned adjustment can be easily performed when an object lens of an optical system, such as a camera or the like, has been exchanged for another lens with a different focal distance.

In order to carry out the above-mentioned object, the automatic focusing apparatus of the present invention comprises a base for mounting a sample, a first detector for detecting a position of the sample as a pressure by supplying gas thereinto, the pressure being detected relative to a gap distance between the sample and said first detector, a second detector for determining a reference pressure by supplying said gas thereinto, the reference pressure being determined by said second detector when the sample for calibration mounted on said base is set at a desired focusing position, said gas supplied into said second detector being derived from the same gas supply source as that supplied into said first detector, control means for controlling and driving said base responsive to a pressure difference between the detected pressure by said first detector and the reference pressure by said second detector, and means for supporting said base, said base being movable, by said supporting means, responsive to said control means, until when the pressure difference reaches a predetermined constant value, more particularly, when the detected pressure may be equivalent to the reference pressure, whereby the sample can be automatically positioned on the desired focusing position.

DESCRIPTION OF THE PREFERRED EMBODIMENTS

The present invention will be hereinafter explained in detail by reference to FIGS. 3 and 4.

Figure 1:
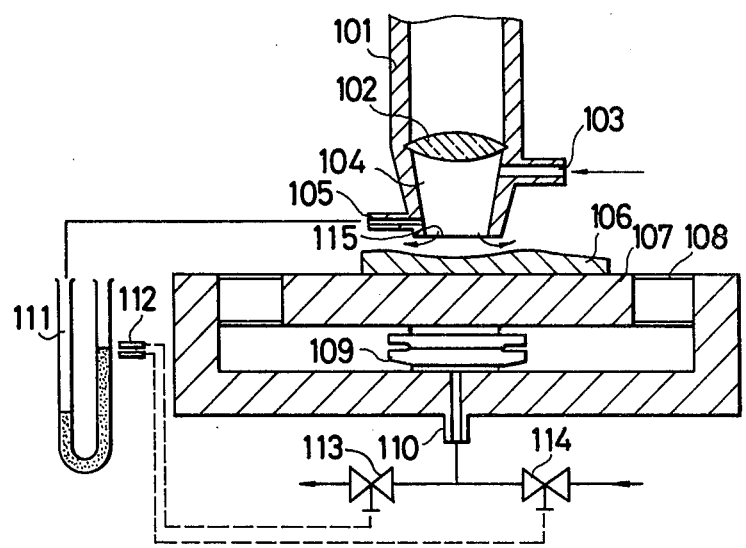
FIG. 1 is a schematic cross-sectional view showing a focusing apparatus of the prior art.
Figure 2:
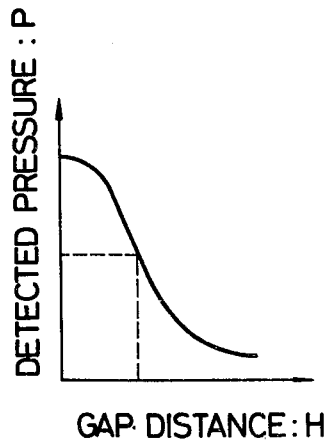
FIG. 2 is a characteristic diagram of a detector such as an air micrometer.
Figure 3:
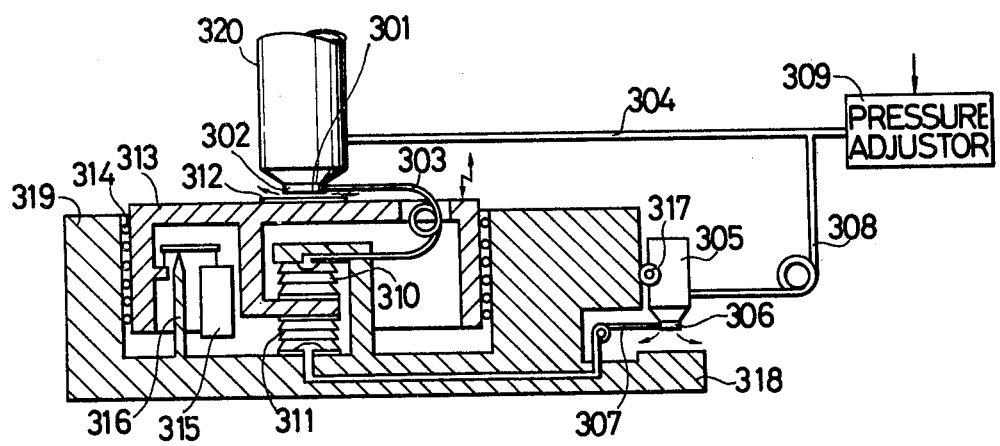
FIG. 3 is a schematic (cross-sectional) view illustrating an embodiment of the present invention.

FIG. 3 is a schematic view illustrating an embodiment of the present invention. A position adjustor (or second detector) 305, such as an air micrometer or the like, for initially determining the focusing position before the operation for positioning the surface of the sample (or the substrate) onto the focusing position, is provided on a portion of the apparatus. The gas, maintained with a constant pressure and supplied from a pressure regulator 309, is divided into two portions, one portion being supplied to a first detector 301 through pipe 304 to be jetted out of a first orifice 302, as shown with the arrows in FIG. 3, and the other portion being supplied to the second detector 305 through a second flexible pipe 308 to be jetted out of a second orifice 306, also shown with arrows in FIG. 3. The first detector 301 may be an air micrometer, or the like, for detecting the present position of the substrate by the corresponding pressure thereto, and is provided in a lens housing 320 of an optical system.

The gas pressure corresponding to the clearance or the gap between the first detector 301 and the substrate 312, being the detected pressure, is passed into an upper (or first) bellows 310 through a first flexible pipe 303. On the other hand, the gas pressure corresponding to the gap between the second detector 305 and a reference plate 318, provided in opposition to the second detector 305, being a reference pressure, is passed into a lower (or second) bellows 311 through a third flexible pipe 307. The effective cross-sectional area of the first bellows 310 is equivalent to that of the second bellows 311. When the internal pressure of the first bellows 310 increases, then the first bellows 310 is provided between a rigid base (or rigid body) 319 and the base 313 such that the force due to the increasing internal pressure can operate on the base 313 in the direction to lower the base 313, while the second bellows 311 is provided between the rigid base 319 and the base 313 such that the base 313 can be lifted up or raised by the force occurring from increasing internal pressure of the second bellows 311.

The base 313 for mounting the substrate 312 can be smoothly moved up and down in the direction of the optical axis of the optical system by a guide mechanism 314 which is provided between the rigid base 319 and the base 313. The guide mechanism 314 may be a bearing system according to the demand. Further, the base 313 is adjusted and maintained by a load or weight 315 acting through a fulcrum 316 so as to be able to be balanced at an appropriate position when the detected pressure measured by the first detector 301 and the reference pressure measured by the second detector 305 is not applied to the first bellows 310 and the second bellows 311. In this case, a spring mechanism can be used in order to maintain the base 313 on the balanced position.

A method for the focusing adjustment will be hereinafter detailed. The gap between the second detector 305 and the reference plate 318 is widened by operating a screw 317, and then, the reference pressure and the internal pressure of the second bellows 311 are decreased. Thus, the base is lowered to widen the gap between the substrate 312 and the first detector 301, and the detected pressure is decreased. Accordingly, the base 313 can be moved until the pressure difference between the detected pressure measured by the first detector 301 and the reference pressure measured by the second detector 305 reaches a predetermined constant value, for example, the value of zero, i.e. when the detected pressure equals the reference pressure. Then, the base 313 is stopped at the focusing position. On the other hand, if the gap between the second detector 305 and the reference plate 318 is narrow, then the base 313 is lifted or raised up.

The ratio of the gap distance between the first detector 301 and the sample 312 to the gap distance between the second detector 305 and the reference plate 318 is inversely proportional to the size of the aperture of orifice 302 to that of the aperture of orifice 306. Therefore, by making smaller the aperture of orifice 306 of the second detector 305, the range of adjustment can be widened or increased, so that fine adjustment of the position of the substrate surface can be easily performed. The adjustment of the gap between the second detector 305 and the reference plate 318 can also be accomplished by moving the reference plate 318 instead of the second detector 305.

Accordingly, the sample 312 for calibration is mounted onto the base 313 and is positioned at the position of the focal distance of the object lens, i.e. the focusing position, and then the gap distance between the second detector 305 and the reference plate 318 corresponding to the focusing position is initially determined by adjusting the second detector 305 or the reference plate 318. The reference pressure corresponding to this gap distance is detected by the second detector 305. Thus, the adjustment for positioning the substrate at the focusing position can be easily and precisely achieved. Further, it is possible in the present invention, to completely remove the influence of pressure fluctuation of the gas supply source by making the throat formed within the first detector 301 equivalent to that formed within the second detector 305, since the gas supplied into the first detector 301 and the second detector 305 is derived from a common gas supply source.

In the automatic focusing apparatus of the present invention, the error rate ($\Delta$) of the position of the substrate 312 controlled after the initial position has been predetermined by the second detector 305 can be approximated as follows: $\Delta = K/(\beta \cdot S)$, wherein $\beta$ denotes a detecting sensitivity of the first detector 301, $S$ an effective area of the first bellows 310, and $K$ a spring constant of the supporting system including the bellows 310, 311, the bearing 314 and so on.

Accordingly, by decreasing the spring constant (K) of the supporting system, and increasing the detecting sensitivity ($\beta$) and the effective area ($S$), it is easily possible to hold the focusing position error below an allowable value.

As an example of the above-stated embodiment, when a gap distance of 40 ($\mu$m) between the first detector 301 and the substrate 312 has been established, by maintaining the air at a constant pressure of 0.9 (kg/cm$^2$) by the pressure adjustor 309, and by adjusting the second detector 305, the pressure value detected in the first flexible pipe 303 is 0.35 (kg/cm$^2$). Accordingly, the gap distance between the first detector 301 and the substrate 312 can be maintained within the error of $\pm 1\%$ against the concave and convex amount, 1 (mm), on the surface of the substrate, wherein the detecting sensitivity ($\beta$) is 0.012 ((kg/cm$^2$)/$\mu$m), the effective area ($S$) is 22.5 (cm$^2$), and the spring constant (K) is 1.6 (kg/mm). It is noted, however, that the present invention is not limited to these numeral values.

Figure 4:
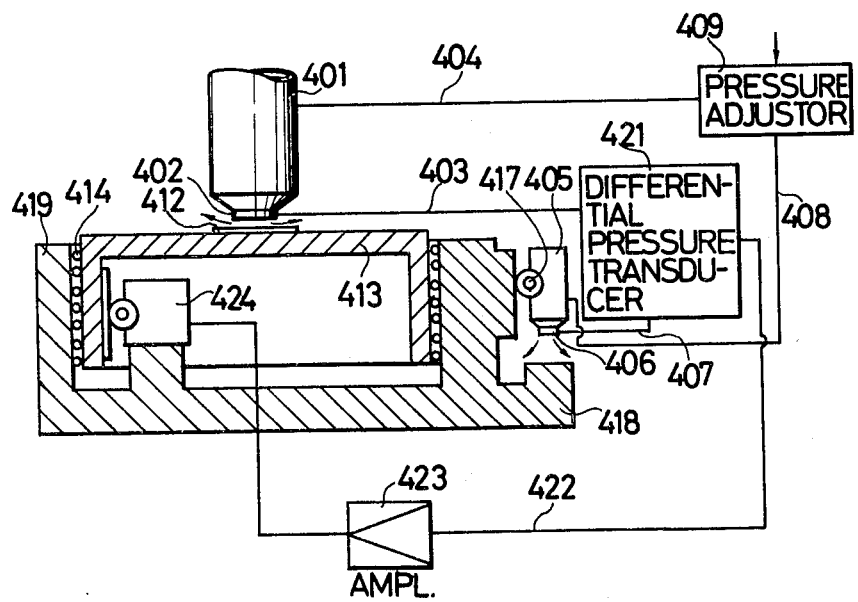
FIG. 4 is a schematic view illustrating another embodiment of the present invention.

FIG. 4 is a schematic view illustrating another embodiment of the present invention. In this embodiment, a base 413 can be electrically controlled by using a differential pressure transducer 421 and a servomotor 424 instead of the bellows 310 and 311 in the embodiment shown in FIG. 3. A first detector 401 and a second detector 405 are equivalent to the first detector 301 and the second detector 305 shown in FIG. 3, respectively. The detected pressure of the first detector 401 is passed into the differential pressure transducer 421 through pipe 403, and the reference pressure of the second detector 405 is passed into the differential pressure transducer 421 through pipe 407.

A piezoelectrical transducer can be used as the differential pressure transducer: for example, a transducer which converts a pressure value into an electrical signal, by impressing the pressure on both sides of a diaphragm, and then by detecting the deviation of the diaphragm occurring by the pressure difference between the both sides thereof by means of a detector such as a strain gauge. The pressure difference between the detected pressure and the reference pressure is detected by the differential pressure transducer 421 and produces an electrical signal which is sent to an amplifier 423 through lead line 422. Further, the servomotor 424 is controlled by the amplifier 423, and the base 413 is driven through an appropriate transfer means 414 such as a bearing, a screw, or the like. In this case, the base 413 is moved by the servomotor 424 until the pressure difference between the detected pressure and the reference pressure reaches a predetermined constant value, for example, a zero value, i.e. when the detected pressure is equivalent to the reference pressure. Thus, the gap between the first detector 401 and the substrate 412 can be maintained at a predetermined distance, for example, the focal distance. According to this embodiment, the spring constant of the supporting system in theory becomes zero so that the focusing position error in theory may also be zero.

In each embodiment of FIGS. 3 and 4, the second (or reference) detector 305, 405 is mounted on the rigid base 319, 419, and has such a construction that gas jetted from the orifice 306, 406 is obstructed by the reference plate 318, 418. However, the second detector in the present invention is not limited to such the embodiments and can be provided on an arbitrary portion of the apparatus. Any detector into which gas is supplied through the flexible pipe 308, 408, from the same supply source as that of the first detector 301, 401, and which may detect a pressure capable of adjusting by itself when transmitted to the bellows 310, 311, or the differential pressure transducer 424, through the flexible pipe 307, 407, can be used as the second (or reference) detector in the present invention.

The automatic focusing apparatus according to the present invention in a focusing apparatus utilizing air pressure is characterized by a reference or second detector having the same gas supply source as that of the first detector, and by the base for mounting the sample or substrate being controlled such that the pressure values detected in both detectors become equivalent. In general, the pressure difference between both pressure values becomes a desired constant value, whereby it is possible to easily and precisely position the sample or substrate at the desired focusing position with a remote operation without influence by pressure fluctuations of the gas supply source.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

We claim:

1. An automatic focusing apparatus for positioning a sample at a predetermined focal position of an optical system, comprising:
   mounting means for mounting the sample;
   first detector means, coupled to the optical system, for detecting a gas pressure relative to a gap distance between the sample and the first detector, the gas being supplied from a gas supply source and jetted toward the surface of the sample through a first orifice of the first detector means;
   second detector means, for detecting a reference gas pressure corresponding to the desired focusing position of said optical system by supplying a gas thereinto and then jetting it toward a reference plate through a second orifice of the second detector means, the reference pressure being adjustable by varying a gap distance between the second orifice and the reference plate,
   control means for controlling and driving the mounting means in response to a pressure difference between the gas pressure detected by the first detector means and the reference gas pressure detected by the second means; and
   supporting means for supporting the mounting means, the mounting means being movable by the supporting means in response to the control means.

2. An automatic focusing apparatus as claimed in claim 1, wherein said gas is supplied to both said first detector means and said second detector means from the same gas supply means at a constant pressure.

3. An automatic focusing apparatus as claimed in claim 2, wherein said mounting means includes a base structure on which said sample is disposed.

4. An automatic focusing apparatus as claimed in claim 3, wherein said control means comprise flexible means for varying volume in response to said pressure difference, said base structure being movable in a direction parallel to the optical axis of the optical system in response to said varying volume.

5. An automatic focusing apparatus as claimed in claim 4, wherein said flexible means comprise a first bellows which has a variable volume in response to said gas pressure detected by said first detector means, and a second bellows which has a variable volume in response to said reference pressure detected by said second detector means, both of said bellows being connected to said base structure in such a manner that the volume of said first bellows increases as the volume of said second bellows decreases.

6. An automatic focusing apparatus as claimed in claim 5, wherein said first bellows has an effective area equivalent to that of said second bellows.

7. An automatic focusing apparatus as claimed in claim 3, wherein said supporting means comprise a rigid body structure, and guiding means for smoothly guiding said base structure in a direction parallel to the optical axis of the optical system, said control means being disposed between said base structure and said rigid body structure.

8. An automatic focusing apparatus as claimed in claim 7, wherein said guiding means include bearing means disposed between said base structure and said rigid body structure for bearing relative movement therebetween in response to said control means.

9. An automatic focusing apparatus as claimed in claim 8, wherein said base structure, said control means, and said second detector means are arranged on said rigid body structure.

10. An automatic focusing apparatus as claimed in claim 1, wherein each of said first and second detector means comprise an air micrometer.

11. An automatic focusing apparatus as claimed in claim 1, wherein said control means comprise a differential pressure transducer means for converting the pressure difference between the gas pressure detected by said first detector means and the reference gas pressure detected by said second detector means into an electrical signal, and servomotor means for driving said mounting means in response to said signal derived from said differential pressure transducer means, said mounting means being moved by said servomotor means in a direction parallel to the optical axis of the optical system.

12. An automatic focusing apparatus as claimed in claim 11, wherein said control means further includes amplifier means connected between said differential pressure transducer means and said servomotor means for amplifying said electrical signal, said servomotor means being driven in response to the amplified signal derived from said amplifier means.

13. An automatic focusing apparatus as claimed in claim 11, wherein said supporting means comprise a rigid body structure, and guiding means for smoothly guiding said mounting means in said direction parallel to the optical axis of the optical system, said servomotor means being arranged between said mounting means and said rigid body structure.

14. An automatic focusing apparatus as claimed in claim 13, wherein said guiding means include bearing means disposed between said mounting means and said rigid body structure for bearing relative movement therebetween in response to said control means.

15. An automatic focusing apparatus as claimed in claim 14, wherein said mounting means, said control means, and said second detector means are arranged on said rigid body structure.

16. An automatic focusing apparatus as claimed in claim 1, wherein said gas can be adjusted to a constant pressure by a pressure regulating means.

17. An automatic focusing apparatus as claimed in claim 1, wherein said first detector means are arranged within a lens housing of the optical system.

18. An automatic focusing apparatus as claimed in claim 1, wherein the ratio of the gap distance between the first orifice and the sample to the gap distance between the second orifice and the reference plate is inversely proportional to the ratio of the size of the aperture of the first orifice to the size of the aperture of the second orifice.

19. An automatic focusing apparatus as claimed in claim 18, wherein the range of adjustment of the apparatus can be changed by varying the aperture size of one of the first and second orifices.

20. An automatic focusing apparatus as claimed in claim 1, wherein the first detector is located in a lens housing of the optical system.

21. An automatic focusing apparatus as claimed in claim 1, wherein the second detector means and the reference plate are both located on the supporting means.

22. An automatic focusing apparatus as claimed in claim 21, wherein the reference plate is stationary and the gap distance between the second orifice and the reference plate is varied by moving the second detector means.

23. An automatic focusing apparatus as claimed in claim 22, wherein the stationary reference plate is an integral part of the support means.

24. An automatic focusing apparatus as claimed in claim 1, wherein the second detector is stationary and the gap distance between the second orifice and the reference plate is varied by moving the reference plate.

25. An automatic focusing apparatus as claimed in claim 1, wherein the gas is supplied from the gas supply source into the first detector means in a turning flow.

* * * * *